Patented Oct. 6, 1936

2,056,238

UNITED STATES PATENT OFFICE 2,056,238

INSECTICIDAL SPRAY COMPOSITIONS

William Hunter Volck, Watsonville, Calif., assignor to California Spray-Chemical Corporation, Berkeley, Calif., a corporation of Delaware No Drawing. Application February 3, 1934, Serial No. 709,631

10 Claims. (Cl. 167—43)

The invention relates to compositions useful in the preparation of insecticidal sprays and more particularly to compositions which contribute improved wetting, spreading and sticking characteristics to oil emulsion sprays, to aqueous sprays carrying solids in suspension and to sprays in which both suspended solids and emulsified oils are incorporated.

It has long been recognized by those skilled in the art of combatting insects and parasites harmful to agricultural and horticultural crops that the effectiveness of lead arsenate and similar water insoluble insecticides is dependent upon the deposition of a uniform, continuous and adherent film of the active material on all of the surface of the host receiving treatment. When, as was formerly the case, simple water suspensions of such toxic agents were sprayed onto the fruit and foliage of an insect infested host, none of these conditions were substantially fulfilled; a large part of the suspended material ran off with the drip and such deposit as remained was only in patches and adhered only loosely so that the first wind or rain dislodged the major portion of it. Needless to say, the percentage of insect kill was seldom satisfactorily high.

It has also long been recognized by economic entomologists and horticulturists that no single insecticidal substance and even further that no one type of insecticidal material is effective against all the insects that may infest a given host at the same time. The recognition of this fact led at first to the practice of successively treating or spraying with different materials for the elimination of different types of insect pests. Such obviously wasteful expenditure of labor naturally brought about many attempts to combine variously active insecticidal ingredients in the same preparation.

While this idea was simple and logical enough, its satisfactory execution was soon found to be complicated by many factors such as chemical and physical interaction between the various active ingredients both before and after application to the living host, so that the combined effect of two ingredients when simultaneously applied was seldom the sum of their respective effects when applied separately. Probably the most serious of all such factors had to do with damage to the host occasioned by interaction between certain ingredients in complex spray compositions after they had been applied.

During the early development of this basic idea of combining several insecticidally active ingredients in the same spray composition it occurred to me that the highly effective phytonomic petroleum oils such as those defined and described in my issued patents, #1,707,465 and #1,707,468, might be applied together with lead arsenate suspensions and that such combination might result in an insecticidal preparation of extreme potency and of very wide usefulness. It further appeared that the oil, in addition to its own inherent insecticidal action, might contribute just the sticking action necessary to effect a more satisfactory retention of lead arsenate on the sprayed surfaces.

Extensive tests on a commercial scale soon demonstrated that this hope was probably realizable though the combination was not entirely free of complicating difficulties, such as those just enumerated. It was, for instance, found that when a quantity of phytonomic petroleum oil emulsion containing certain emulsifiers was added to a lead arsenate suspension a heavy and adherent deposit of arsenate was produced. This combination was found to be very satisfactory in more or less arid regions such as the apple districts of the Pacific Northwest, but when applied in more humid climates it produced an undesirable amount of arsenical injury in the form of withering and foliage burn.

At that time it was the general practice to employ alkali soaps, alkali caseinate and various other alkaline reacting emulsifiers in preparing spray oil emulsions and often still further to increase the alkalinity of the resulting dilute emulsion through the use of ammonia as a preservative when caseinate was used as the emulsifier. In the light of a theory, which was then prevalent, to the effect that foliage damage from lead arsenate was due to the liberation of soluble arsenic through excess alkalinity, it appeared that in order safely to apply an oil emulsion together with lead arsenate suspensions, new emulsifiers for the oil would have to be found which were not only neutral when applied but which could be counted upon to remain so.

It further developed during the course of these early experiments that while a heavy adherent film of arsenate resulted from the use of the mineral oil emulsions which we were then supplying to the trade the deposit was neither as uniform in thickness nor as complete in its coverage as was to be desired. It thus appeared that in order to improve the action in this respect preparations with better wetting and spreading characteristics would have to be provided.

In order thus simultaneously to realize the fullest advantages of a phytonomic petroleum oil emulsion spray and a lead arsenate suspension without danger of substantial host damage from the combination, a neutral spray conditioning composition possessing emulsifying, wetting, spreading, flocculating and sticking properties, each to a high degree, was needed. It was further apparent that such material or composition must in addition be compatible in solubility, in volatility, in freedom from any harmful action to the host, and of equal importance in cost of the commercial use to which it was to be put.

It is common practice in the distribution of my previously described phytonomic petroleum oil emulsions to market the oil in concentrated emulsion form containing 75% or more of oil, such emulsions being diluted to the proper extent by the user. It is usually convenient to effect this dilution by adding the concentrated emulsion to an appropriate quantity of water in the tank of the spray apparatus just prior to the start of the spraying operation. In order to facilitate this tank mixing operation it is desirable that the concentrated oil in water emulsion marketed shall not be stiff and jellylike but rather shall be readily flowable. A high degree of flowability of such a product is all the more desirable when it is to be used in conjunction with aqueous suspensions of solids such as lead arsenate, since a complete and uniform dispersion of the oil droplets is necessary in order that they may become properly associated with the suspended particles of solid and may thus result in a smooth and uniform film of oil and solids on the surfaces receiving spray treatment.

It was further discovered, during the endeavors to render oil emulsions and lead arsenate suspensions applicable in the same spray, that in order for the oil and solid to become properly associated and by proper flocculation to form a satisfactory deposit a fatty acid soap appeared to be a necessary constituent of the emulsifier used in preparing the concentrated oil emulsion. Since the fatty acid soaps then in use were well known to hydrolyze to give alkaline solutions which, as previously pointed out, are undesirable for use with lead arsenate a different or at least a modified soap was needed in order to make possible the realization of our ultimate purpose.

It is the object of this invention to provide a new composition of matter, for use particularly in insecticidal spray preparations, which shall possess the foregoing emulsifying, wetting, spreading, flocculating and sticking characteristics and shall at the same time be free from any injurious effect on growing foliage when used with a lead arsenate or similar insecticidal solid suspended in water or when applied with an emulsion of a phytonomic petroleum oil in water or when used with both suspended in the same aqueous spray medium.

It is another object of this invention to provide a concentrated emulsion of a phytonomic oil in water which can be effectively and economically combined in insecticidal spray application with such powerful solid insecticides as lead arsenate.

Still other objects contributory to the broad success of the invention will be obvious to one skilled in the art both from the foregoing introductory discussion and from the description presented hereinafter.

In the simultaneous application of an oil emulsion and a suspended solid in a combination insecticide it is necessary for satisfactory operation that the oil remain highly dispersed and the solid completely suspended until the spray composition strikes the infested leaf, stalk or fruit whereupon it becomes necessary that the emulsion shall break quickly and completely and that the suspended solid be thrown out of suspension or flocculated immediately in order that they shall not be carried away by the water which collects and drips off. Having quickly flocculated and/or coagulated both the oil and the solid matter is, however, usually not enough to insure their most economical utilization. A material which will tend to stick both the phytonomic oil and the solid insecticide in place and yet which will cause them to spread rapidly over the whole surface treated and to penetrate readily into every crevice and irregularity in such surface is also essential.

Whenever it becomes necessary or even desirable to provide a composition of matter having a multiplicity of functions as diverse as those above recited, i. e. emulsifying, wetting, spreading, flocculating, sticking, etc., it is usually necessary to synthesize such a composition from several separate ingredients each of which contributes its own particular characteristic or characteristics to the composition as a whole. The present instance has been found to fall squarely under this generalization. Furthermore, when the list of desired characteristics includes such diametrically opposite functions as emulsifying and flocculating action, or spreadability and sticking power, the choice of ingredients which shall contribute each to the desired extent is by no means a simple matter.

The present invention has to do with a new composition of matter, which I have chosen to term a spray conditioning agent, containing several ingredients selected, prepared and combined in such manner as to produce the delicately balanced system required.

As previously pointed out one of the prime requisites for an emulsifying, wetting, spreading, sticking, composition to be used with oil-lead arsenate compositions is acid-alkali neutrality. Neither the ordinary alkali soaps or the alkali caseinates which have previously been used as emulsifiers meet such a requirement and yet both soap and a casein constituent are desirable components of a spray conditioning preparation because of certain of their other properties. In fact, as previously remarked, and as demonstrated by tests extending over a wide range of commercial operation, fatty acid soap appears to be essential to the production of a smooth, uniform and adherent film of lead arsenate and oil.

In order to provide a soap which shall be substantially neutral to phenolphthalein at all dilutions I have used oleic acid reacted under proper conditions with slightly less than an equivalent amount of caustic alkali or alkali carbonate or ammonia or appropriate organic bases.

As an example of such a composition and a method which I have found satisfactory in its preparation the following example is given:

EXAMPLE #1

*Neutral soap solution*

| | Pounds |
|---|---|
| Oleic acid | 750 |
| Caustic potash | 175 |
| Water | 2825 |
| After cooling add | |
| Oleic acid | 194 |

The caustic is dissolved in one-half the water and the first portion of oleic acid is mixed with the other half at about 50° C. These two aqueous solutions are then mixed with vigorous agitation. After cooling the second portion of oleic acid is added and dispersed by vigorous circulation. The finished product will remain slightly turbid but completely fluid.

While we have customarily used potassium oleate as the neutral soap in our tests it will be readily apparent to those skilled in the art that other soaps might be prepared by an analogous method which would be substantially neutral to phenolphthalein and equally satisfactory in all other respects.

Such a soap solution containing from 20-30% by weight of soap material and 80-70% water will hereinafter be referred to merely as "neutral soap solution".

In providing the other necessary ingredients of my complex spray conditioning composition I have found that certain sulfonic salts including the water soluble petroleum sulfonic salt preparation which was described in my recent patent, #1,922,607, as a powerful bland, neutral, emulsifying, wetting and spreading agent, have an added property which makes them especially useful in the present connection.

As previously mentioned casein has emulsion stabilizing characteristics and also spreading and sticking power, all of which are particularly desirable in the present composition. Casein in anything but alkaline form is, however, not water soluble and since alkaline reacting compounds must be rigorously excluded from compositions designed for my present purpose casein appeared to be barred.

It has, however, developed that by proper coaction of a neutral sulfonic salt material, and especially the one which I have prepared from petroleum oils, with free neutral casein, both pass readily into clear neutral aqueous solution and constitute a second stock preparation useful in the ultimate production of my spray conditioning material. As illustrative of the proportions of ingredients to be used and their method of combination, the following specific example is given:

Example #2

*Casein-sulfonic salt solution*

| | Pounds |
|---|---|
| Casein | 468 |
| Water | 2592 |
| Sulfonic salt solution | 2616 |

These materials are heated together, just below the boiling point until the casein goes completely into solution. The sulfonic salt solution contains about 30% (wt.) of the alkali salts of the sulfonic compounds previously described, 20% inert material and 50% water. A solution prepared according to the foregoing example will therefore contain approximately 30–35% by weight of casein and sulfonic salt and 70–65% water, though such concentrations appear to have no particular significance and are employed merely for convenience in compounding. It has been found that a weight ratio of sulfonic salt to casein of about 0.75 to 1.00 is necessary to effect solution of the casein. Higher ratios may often be desirable. I have sometimes employed a ratio as high as 5.0 to 1.0.

A stock solution of casein-sulfonic salt in the proportions and at the concentrations just given will hereinafter be referred to as a "liquid spreader".

When this liquid spreader is mixed with substantially an equal volume of neutral soap solution a product is obtained which, while of particular advantage in connection with horticultural spray compositions comprising ingredients sensitive to alkali, is well nigh universal in its applicability as a conditioning, control or directive agent in sprays which employ water as a vehicle.

It may, for instance, be used in dispersing pyrethrum and derris extracts or rotenone. It is highly efficient in suspending, spreading, flocculating and sticking the solid components of aqueous suspension sprays in general and particularly such suspensions as the fluorine compounds, fluosilicates and the lead-arsenic compounds. It's most outstanding present contribution to the insecticidal art is, however, in making possible the combination in the same spray of an alkali sensitive insecticidal material and a petroleum oil with a minimum of damage to the sprayed host and with a highly satisfactory deposition and retention of the insecticidal ingredients.

Another advantage of my composition is that it may be used as the emulsifier, stabilizer, etc., in the concentrated phytonomic petroleum oil emulsions of commerce which are to be employed alone and for their own particular properties, or it may be used in other concentrated emulsions designed primarily to be used in securing the foregoing advantages in the deposition of arsenate of lead or other solid insecticidal ingredients. The only substantial difference being that in such latter emulsions a somewhat higher ratio of conditioning agent to oil is employed in the concentrated emulsion as will be more clearly brought out by the specific examples hereinafter provided.

Still one further discovery constitutes a part of my present invention. As is well known in industry any preparation containing casein or its derivatives is readily attacked by destructive organisms and unless used immediately must be protected by a preservative agent. Ammonia, formalin and many other similar preservatives have previously been used in this connection. For my present use I have selected cresylic acid as possessing the requisite high perservative power, being non-injurious to plant life when applied in moderate to low concentrations and being neutral or acid in reaction. In addition to these well known properties I have now discovered that by the inclusion of a quantity of cresylic acid in my conditioning composition which is then used in the preparation of a standard commercial concentrated (83%) phytonomic oil emulsion, a result is produced which was not to have been expected. Such as emulsion is considerably softer and more flowable than when no cresylic acid is included. Flowability in such a product is, as previously remarked, a highly desirable characteristic much appreciated by the operator whose task it is to prepare the final spray preparation in the spray tank or equivalent apparatus.

The inclusion of cresylic acid in varying amount in my formula thus not only serves to preserve the casein but also permits of the ready control of one of the important physical properties of concentrated oil emulsions prepared with it.

My complete spray conditioning composition which possesses emulsifying, wetting, spreading, flocculating and sticking characteristics in variable degree and in balanced relation, is neutral, harmless to vegetation and inexpensive to produce, thus consists essentially of neutral soap, liquid spreader, and water with cresylic acid when and as required. Its properties are variable through variation in the relative proportions of these essential ingredients which may be between rather wide limits, the particular balance of properties required for any given purpose determining the exact proportions to be employed.

In order that my invention may be better understood, one of its many applications is illustrated by the following specific example in which it is employed in the preparation of a concentrated emulsion of a phytonomic petroleum spray oil useful in the application of lead arsenate or other solid suspension.

EXAMPLE #3

Oil emulsion concentrate

| | Gallons |
|---|---|
| Neutral soap solution | 100 |
| Liquid spreader | 100 |
| Calol spray oil #5 (heavy) | 600 |

The emulsion is prepared in the usual manner by slowly adding the oil with vigorous agitation to the combined aqueous solutions of the conditioning agents. By calculating back to the ultimate compositions of the stock solutions as previously given, it will be seen that such an emulsion concentrate would thus contain:

| | Per cent by weight |
|---|---|
| Neutral soap constituents | 3.8 |
| Casein | 1.3 |
| Sulfonic salts | 2.1 |
| Inert material | 1.5 |
| Water | 20.0 |
| Oil | 71.3 |

For other purposes and with oils of different gravities very different proportions of conditioning agent, oil and water may be employed. For instance, in an emulsion to be used alone and not as a carrier for arsenate or other suspension somewhat less of the emulsifying and conditioning materials may be used.

Example #4

Oil emulsion concentrate

| | Gallons |
|---|---|
| Neutral soap solution | 12.5 |
| Casein-sulfonic salt solution | 12.5 |
| Cresylic acid | 2.0 to 8.0 |
| Water | 105.0 |
| Calol spray oil #1 (light) | 700.0 |

In this case the ultimate composition by weight would be:

| | Per cent by weight |
|---|---|
| Soap constituents | 0.45 |
| Casein | 0.16 |
| Sulfonic salts | 0.44 |
| Cresylic acid | .28 to 1.2 |
| Water | 16.73 |
| Oil | 81.94 |

The amount of cresylic acid to be included in the conditioning composition for preservative purposes should be sufficient to give a concentration of 0.2 to 0.5% in the emulsion concentrate. When advantage is to be taken of the fluidity imparted by this material to the emulsion it may be present to 5.0% or more of the finished emulsion.

As an illustration of the very real value of my spray conditioning composition its use in a preparation for the simultaneous application of oil and lead-arsenate is typical.

When one quart of the emulsion of Example #3 and 4 lbs. of commercial lead arsenate were mixed with 100 gallons of water in a spray tank and applied to apple trees, lead arsenate was found to be retained on the leaves to the extent of 112 milligrams per square inch of surface whereas the customary lead-arsenate and fish oil application left only 57 milligrams of the solid arsenate on a similar surface area.

The economic value of my invention in thus increasing the efficiency of utilization of lead arsenate substantially 100% is easily measurable. Its value when used with oil emulsion sprays alone is not so readily measurable but is no less real when judged by the improved operation which has been uniformly realized wherever tests have been made.

Having now described my invention in detail and taught how it may be utilized, I claim:

1. An insecticidal spray conditioning composition useful in preparing horticultural sprays, said composition comprising a fatty acid soap of an alkali metal in which the acid is in sufficient excess over the alkali to insure substantial neutrality to phenolphthalein, casein and petroleum sulfonic salts, all in aqueous solution.

2. An insecticidal spray conditioning composition useful in preparing horticultural sprays, said composition comprising a fatty acid soap of an alkali metal in which the acid is in excess over the alkali, casein and petroleum sulfonic salts all in aqueous solution which is substantially neutral to phenolphthalein on dilution.

3. An insecticidal spray conditioning composition useful in preparing horticultural sprays, said composition comprising a fatty acid soap of an alkali metal in which the acid is in sufficient excess over the alkali to insure substantial neutrality to phenolphthalein, casein, petroleum sulfonic salts and cresylic acid, all in aqueous solution.

4. An insecticidal spray conditioning composition as in claim 1, wherein the soap is potassium oleate containing excess oleic acid.

5. A concentrated emulsion of insecticidal mineral oil dispersed in the aqueous solution of claim 3.

6. An insecticidal spray composition, useful in horticultural pest control, which comprises emulsified mineral oil, a fatty acid soap of an alkali metal which soap is neutral to phenolphthalein due to an excess of the fatty acid, casein and water soluble petroleum sulfonic salts.

7. An insecticidal spray composition, useful in horticultural pest control, which comprises emulsified mineral oil, a fatty acid soap of an alkali metal which soap is neutral to phenolphthalein due to an excess of the fatty acid, casein, water soluble petroleum sulfonic salts and an alkali sensitive stomach or contact poison for insects.

8. An insecticidal spray composition as in claim 7 wherein the alkali sensitive component is lead arsenate.

9. An insecticidal spray composition as in claim 7, wherein the alkali sensitive component is an inorganic fluorine compound.

10. An insecticidal spray composition as in claim 7 wherein the alkali sensitive component is a derivative of a substance selected from a group comprising pyrethrum, derris and cube.

WILLIAM HUNTER VOLCK.